United States Patent [19]

Gabbard et al.

[11] 3,922,496

[45] Nov. 25, 1975

[54] TDMA SATELLITE COMMUNICATIONS SYSTEM WITH GUARD BAND OBVIATING ONGOING PROPAGATION DELAY CALCULATION

[75] Inventors: Ova Gene Gabbard, Germantown, Md.; John M. Husted, Vienna, Va.; Pradman P. Kaul, Gaithersburg; Andrew M. Werth, Silver Spring, both of Md.; Andrew M. Walker, Reston, Va.

[73] Assignee: Digital Communications Corporation, Gaithersburg, Md.

[22] Filed: Feb. 11, 1974

[21] Appl. No.: 441,710

[52] U.S. Cl. ............ 179/15 BS; 179/15 BA; 325/4

[51] Int. Cl.$^2$ ............ H04J 3/06

[58] Field of Search .. 325/4, 58; 179/15 AL, 15 BS, 179/15 BA; 178/69.5 R

[56] References Cited

UNITED STATES PATENTS

| | | | |
|---|---|---|---|
| 2,406,165 | 8/1946 | Schroeder | 179/15 AL |
| 2,723,309 | 11/1955 | Lair | 179/15 AL |
| 3,529,243 | 9/1970 | Reindl | 325/58 |
| 3,593,138 | 7/1971 | Dunn | 325/4 |

*Primary Examiner*—David L. Stewart
*Attorney, Agent, or Firm*—Stanley B. Green; Pollock, Phillitt & Vande Sande

[57] ABSTRACT

A satellite communications system in which messages from a plurality of stations are received at a synchronous satellite in time multiplex without overlapping. The system is so arranged that the apparatus to insure absence of time overlap in received messages at the satellite is relatively simple compared with the prior art closed-loop synchronizing systems. In particular the guard time is controlled to be at least equal to the double hop propagation delay variation eliminating the need for accurate measurement of propagation delay. Furthermore, as a result of the absence of critical propagation delay measurement, the acquisition process does not require special purpose apparatus.

15 Claims, 3 Drawing Figures

Master Station Time Frame

Outlying Station Message Bursts

TDMA SATELLITE COMMUNICATIONS SYSTEM WITH GUARD BAND OBVIATING ONGOING PROPAGATION DELAY CALCULATION

BACKGROUND OF THE INVENTION

Satellite communications systems have now been in use for a number of years. In such a system, an earth station transmits to a synchronous satellite which receives the message and retransmits it back to another earth station. The satellite than acts as a transponder in a communication link. Due to the effort and expense involved in placing a satellite into orbit it is generally desired that such satellites be utilized to the maximum. As a result, systems have been envisioned in which a number of earth stations can communicate with a satellite in a time multiplexed mode of operation. Although a satellite may contain a number of transponders we will, hereinafter, consider only one such transponder or a satellite with only one transponder. In the time division multiple access (TDMA) mode a number of earth stations can sequentially transmit to the satellite. Each station transmits in a burst mode. If these message bursts are received at the satellite sequentially, with no overlap, they may be retransmitted by the satellite without grabling or distortion. It should, however, be apparent that while it is necessary for the satellite to receive the transmission sequentially, this does not necessarily means that the earth stations must transmit in a like manner. Due to the different propagation delays from different earth stations to the same satellite, the relative transmission periods may be different when viewed from an earth station. And of course, if the multiple transmissions from multiple earth stations overlap in time when they are received at the satellite, the result will be garbled and distorted at least to the extent of the time overlap. The prior art recognized this problem and has solved it to the extent that TDMA communications systems are in operation. One such solution is disclosed in Gabbard Pat. No. 3,562,432 for "Synchronizer for Time Division Multiple Access Satellite Communications System." As disclosed in the afore-mentioned patent, each ground station receives a reference or marker signal and its own transmission period or time slot is determined by delaying a predetermined amount from receipt of the reference marker. Furthermore, the afore-mentioned system recognizes that due to differences in propagation delays between widely spaced earth stations, errors may be introduced into the system. As a result, a feedback arrangement is provided whereby each earth station receives not only the reference marker but also its own transmissions. In this way the propagation delays from that earth station to the satellite can be accurately measured and appropriate corrections made. Furthermore, to provide for tolerances in the system, a guard time is placed into the cyclical time frame during which time, as viewed at the satellite, no messages are received. Any departure from nominal conditions, up to the extent of the guard time, is absorbed with no resulting message overlaps. Because such a synchronization system requires feedback from the satellite for its error corrections other apparatus is required to perform the acquisition process. At the time acquisition is initiated, of course, the ground station will have no feedback signal on which to base corrections. Therefore, a special low level signal is transmitted so as not to interfere with transmissions from other earth stations. After receipt of the special low level signal at the satellite it is retransmitted and reception at the transmitting station then enables the synchronizing apparatus to make the appropriate corrections so that when transmission is initiated the message signal will not overlap in time any other message signal received at the satellite. Since these systems must necessarily measure propagation delays in the nanosecond range they are quite sophisticated and complicated.

More particularly the prior art TDMA systems operate in a cyclical time frame wherein a plurality of message bursts each from a different station are interleaved at the satellite. Since the guard times are periods of non-transmission, system efficiency can be defined as the ratio of burst duration to the sum of burst duration and associated guard time.

To achieve high efficiencies the guard time war reduced to the extent such reduction was possible in view of system tolerances.

These foregoing systems operate quite well in their intended environment, however, due to the complexity and associated cost thereof, they are restricted to grounnd stations in which heavy traffic may be expected so as to justify the complicated synchronizing apparatus. The experience with satellite communication systems, however, has led to a demand for greater use of such communication systems. In particular, there is a demand for "thin" traffic systems. Generally these systems are envisioned in which hundreds, or even thousands, or outlying ground stations can communicate with one or a few main earth stations. In such systems the traffic to or from any one particular outlying ground station may be light and thus the term "thin." The few main stations may well have heavy traffic demands. Since the hundreds or even thousands of outlying stations will generally have light traffic, it is not economically justifiable to burden each of these stations with its own synchronizing and acquisition apparatus as referred to above.

SUMMARY OF THE INVENTION

The present invention provides a TDMA satellite communications system in which hundreds or even thousands of outlying stations can communicate with one or a few main earth stations. In particular, the present invention is directed at a method of, and apparatus for, insuring that the multiple transmissions do not overlap in time when received at the synchronous satellite. Furthermore, the present invention accomplishes the foregoing without the necessity for complicated, costly and sophisticated synchronization and acquisition apparatus. To the contrary, however, the apparatus which is provided to insure the absence of time overlap of signals at the satellite is relatively simple. Simply stated, applicants have recognized that the maximum propagation delay variation for any particular system can be quantified, that is, it can be predicted. In mobile thin route stations the delay variation is due to the unknown geographic location of the mobile station (e.g., planes and ships) plus the 24-hour variations is geostationary satellite position relative to any earth reference. In networks of geographically-fixed stations only the satellite 24-hour motion effect contributes to the variation since the average geographic effect can be predicted and accounted by fixed delay compensation particular to each station location. In a thin traffic system each of the stations will be operating at relatively low transmission rates and therefore the propagation delay variation can be absorbed by increasing the guard time between message bursts. In this manner the timing apparatus at each of these stations insures that no time overlap of transmission will occur at the satellite. In effect, the system is open-loop, in that it does not require feedback for its operation. In this manner the complicated and sophisticated precise time measuring circuitry can be eliminated.

More particularly in the system of the present invention a master station communicates with a plurality of earth stations through a satellite relay. The master station time frame consists of a signaling time slot including a unique word or reference marker, two or more digitized voice channels and a plurality, such as 80, teletype channels. Master station signaling transmissions may be received at all stations. Each of the outlying stations is capable of transmitting on a voice channel or on one of the teletype channels. It should be understood that more than one master station may be employed and the number of voice and teletype channels may be varied as will be explained hereafter. Since a number of stations may be operating simultaneously on teletype transmissions a TDMA scheme is used. Each station transmits in a burst mode and the apparatus of the present invention insures the message bursts will interleave and not overlap when received at the satellite relay. The master station signaling time slot makes available to all outlying stations the identity of the unused teletype time slots. Each of the teletype time slots is defined as beginning a predetermined delay after receipt of a reference marker. As will be understood by those skilled in the art the predetermined delay is different for each of the different time slots. Each time slot also includes a guard time and the length of the guard time is determined to insure that the message bursts from the different stations interleave at the satellite relay.

For a nominal system, with equal propagation delay from satellite to all stations and under ideal conditions, no guard time is required. However, the variation in propagation delay from satellite to closest station as compared to propagation delay from satellite to furthermost station means that the furthermost station receives the reference marker $\epsilon$ milliseconds after the closest station does. If both stations timed from the marker the furthermost station would transmit "late." Furthermore the time for the message burst to reach the satellite relay from the furthermost station is $\epsilon$ milliseconds longer than from the closest stations introducing a further variation of $\epsilon$. Thus if the two stations were transmitting in adjacent time slots with no guard time, the furthermost station's message burst would overlap $2\epsilon$ milliseconds into the message burst of the closest station. To prevent this a guard time is introduced with a duration at least equal to $2\epsilon$ milliseconds where $\epsilon$ is the maximum propagation delay variation from the satellite to the plurality of stations.

The acquisition of a time slot is simplified by reason of the fact that each station desiring to transmit has information available as to which time slots are available, if any. To acquire that time slot it is only necessary for the station to transmit, in the chosen time slot, its identity and the information that is required to acquire that time slot. If it is still available when the signal is received at the master station the time slot assignment will be made and the station will receive a go ahead signal. If, by chance, two stations simultaneously attempt to acquire the identical time slot their requests will overlap, be garbled and no time slot assignment will be made. However, this is extremely unlikely and is of minor significance for the stations may then attempt to obtain other time slots. It will be appreciated that the special acquisition apparatus has been eliminated.

Although eliminating the precise time measuring equipment and special acquisition apparatus is desirable this must not occur at the expense of rendering the system uneconomic. The primary economic factor aside from equipment cost is efficiency which has previously been defined. To insure reasonable efficiencies the message burst is timed to be at least equal to the guard time. To recapitulate, each transmitting station is assigned a time slot of duration T. The station transmits a message burst of duration $t_B$ with a guard time G such the $T = t_B + G$ and $G = 2\epsilon$ where $\epsilon$ is the propagation delay variation. Furthermore, $t_B \geq G$ to maintain reasonable efficiencies. An upper bound is placed on $t_B$ for the following reasons. Since a station transmits at a constant rate (during actual transmission) the information content of a message burst is directly proportional to message burst duration $t_B$. Each station must be provided with apparatus to store an amount of information equal to at least the informational content of a message burst. Therefore increasing message burst duration $t_B$ directly increases the extent of storage apparatus required at each station. As a result a balance must be maintained between the competing interests of maximizing efficiency while minimizing the extent of the required storage apparatus and to achieve this we prefer to have $t_B \geq G = 2\epsilon$. It should be understood that the guard time G may be increased over $2\epsilon$ (although $2\epsilon$ is a minimum) and that $t_B$ may be less than or exceed G (varying the efficiency of the system) within the scope of the invention.

In describing the present invention a preferred embodiment will be disclosed comprising a mobile communications system in which one main earth station can communicate with hundreds or even thousands of outlying earth stations each located aboard a vehicle or movable platform (e.g., ship, plane, or oil-drilling rig). As the description proceeds it will become apparent to those skilled in the art that many modifications can be made in the preferred embodiment, that is, a number of main earth stations may be employed, the outlying stations need not be aboard vehicles but may be located on ground (along an oil pipeline, for example), the particular format of time frames may be varied as well as the operating rates of the different transmitters and communications links. Further, other variations not specifically mentioned will also occur to those skilled in the art.

BRIEF DESCRIPTION OF THE DRAWINGS

In describing a preferred embodiment of the present invention which is disclosed in this application reference will be made to the accompanying drawings to which like reference characters identify identical apparatus and in which.

DETAILED DESCRIPTION OF THE INVENTION

Figure 1:
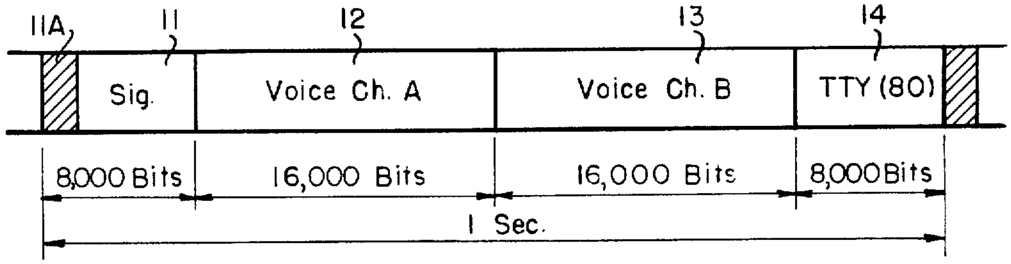
FIG. 1 represents a preferred master station cyclical time frame.

FIG. 1 illustrates a preferred embodiment of the master station time frame. This time frame consists of four portions, 11 through 14, some of which are themselves subdivided into further portions. The master station transmits a 2-phase PSK at a 48,000 bits per second rate in a time division multiplex mode. The 48,000 bits per second consist of 8,000 bits of network signaling, portion 11; 16,000 bits of PCM voice channel A, portion 12; 16,000 bits of PCM voice channel B, portion 13; and finally 8,000 bits of teletype, portion 14. This teletype data portion of the time frame may be preferably subdivided into 80 channels of each 100 bits.

Referring now to portion 11, the signaling portion, it will be seen from FIG. 1 that the initial portion 11A comprises a unique word of N bits. Although the unique word 11A is illustrated as being "lumped," that is a consecutive block of N bits, it may well be distributed, one bit per frame for N frames. However provided, a unique word defines a TDMA time reference. This unique word requires the same auto correlation, cross-correlation and redundency properties needed for previous closed-loop TDMA synchronization systems. In systems where there is only one master station, no multiplexing control is required for the master stations other than the control apparatus which provides the format illustrated in FIG. 1. Furthermore, the prior art contains adequate teachings of suitable control apparatus to provide a message format as illustrated in FIG. 1. In situations where there are two or more master stations it may become necessary to employ the apparatus of the present invention when the transmissions of the master stations are to be received in TDMA by the same satellite transponder. The apparatus of the present invention which insures no time overlap of message bursts at the satellite will be described with reference to FIG. 3. The apparatus at the master station which provides for network signaling and which makes channel and time slot assignments is conventional and need not be described here. See, for instance, Puente et al. U.S. Pat. No. 3,564,147.

Figure 2:
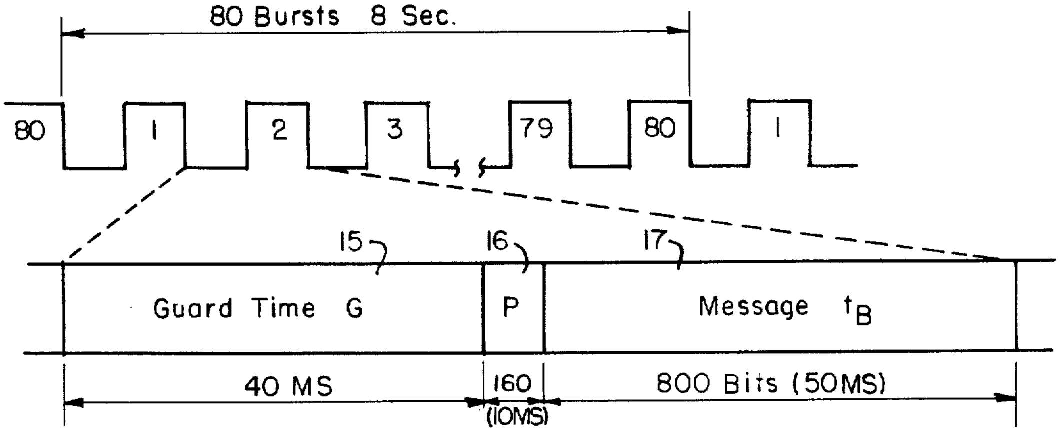
FIG. 2 is a representation of a preferred TDMA cyclical time frame.

FIG. 2 illustrates the outlying station message burst format. Whereas the time frame of the master station had a one second period, the TDMA teletype signaling time frame is 8 seconds in duration. During this 8-second period of time a maximum of 80 message bursts is provided each in its own time slot. Each of the 80 time slots then is 100 milliseconds in duration. Although there are 80 time slots available in the TDMA system, as is well known to those skilled in the art, less than 80 stations may be transmitting simultaneously. The remaining time slots would then be unused and available for a station that desires to transmit. Each time slot is shown as comprising three portions, a guard time 15, a preamble 16 and a message 17. In a preferred embodiment the outlying station transmission can comprise 2 16 kilobits/second modulated carriers. One carrier is continuous mode voice and the other is a 16 K bits/s TDMA channel carrying 80 independent 100 bit per second channels which are used for signaling and/or teletype traffic. The format for the continuous mode voice channel at each of the outlying stations is not illustrated as it forms no part of the present invention and is conventional. The TDMA channel, in particular, the apparatus for insuring that the various message bursts from the plurality of outlying stations are received at the satellite in non-overlapping and interleaved relation is the apparatus which forms the present invention. This apparatus will be described more particularly with reference to FIG. 3.

Utilizing the 16 kilobit per second rate, as an example, a preamble portion 16 which is used for modem timing recovery and unique word transmission comprises 160 bits. The message burst comprises 800 bits. For purposes of description we may consider $t_B$ to be the duration of the preamble and the message burst.

The preferred format, that is, an 8-second time frame provides a reasonable balance between two competing considerations. In the first place, once the burst duration is fixed, increasing the time frame increases the number of time slots available for distribution. However, if the number of time slots is increased by increasing the period of the time frame, then the bit rate must also be increased if the system is to serve a 100 bit per second teletype channel. This increases the storage apparatus required at each station. On the other hand, if the time duration of the time frame is reduced to one second then, for example, with the same bit rate and message burst duration, only 10 time slots are available for distribution. The 8-second time frame with the 800 bit message burst and 50 millisecond message burst duration is a reasonable compromise. Those with ordinary skill in the art will understand how the message burst duration, bit rate and number of time slots can be varied to suit the needs of the communications system. It should be understood, however, that the present invention is not restricted to the exemplary showings of FIG. 2.

Figure 3:
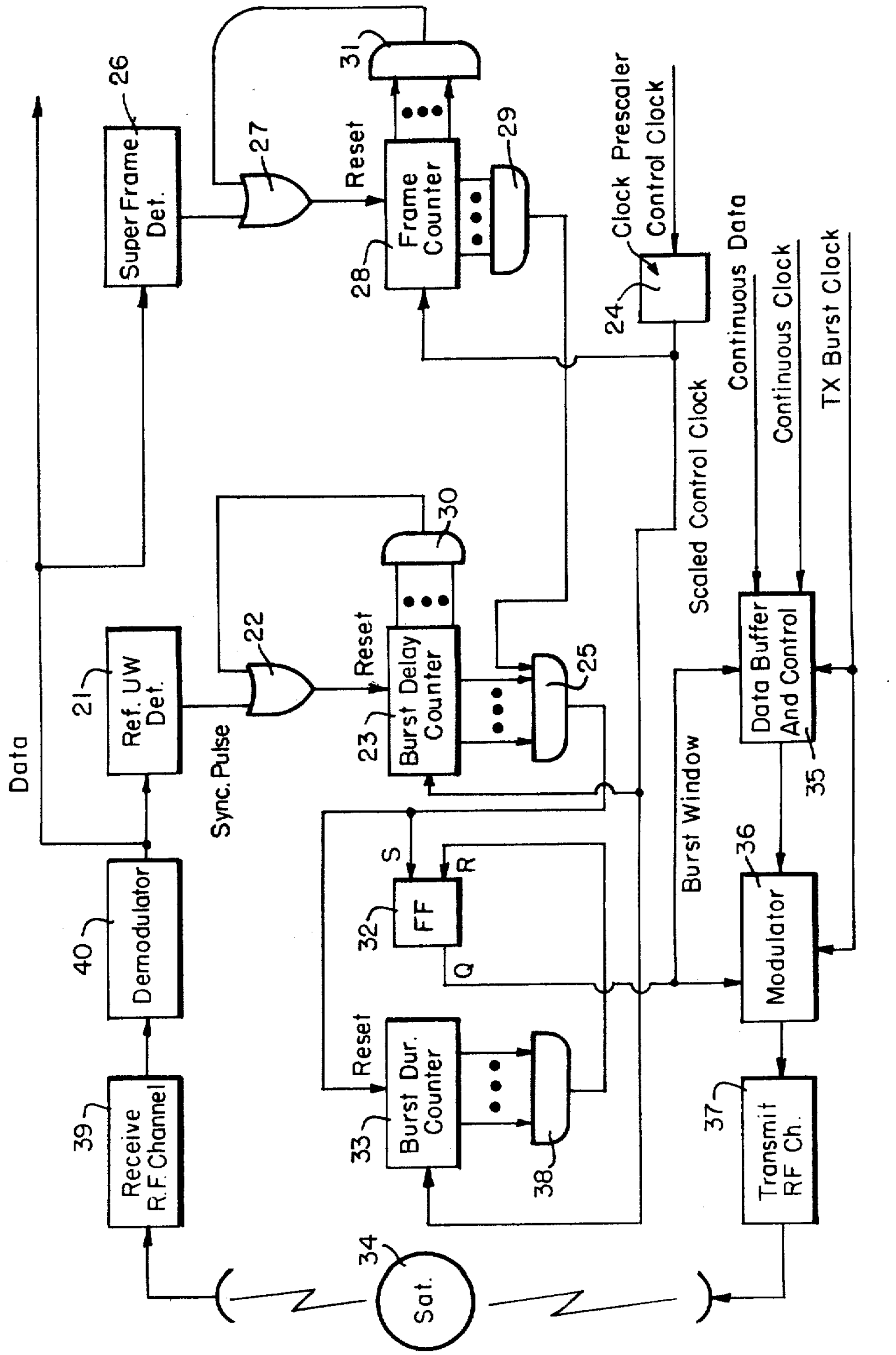
FIG. 3 is a block diagram of a portion of the apparatus at an outlying station, including the apparatus of the present invention which insures proper interleaving of message bursts.

FIG. 3 illustrates the apparatus of the present invention which provides that the plurality of message bursts from a plurality of outlying stations will be received at the satellite in interleaved and non-overlapped time relationship. FIG. 3 illustrates the apparatus at each of the stations which controls the message transmissions so as to achieve the objects of the present invention. Each outlying station comprises, in a receiving portion, an RF channel receiver 39, and a reference unique word detector 21 which is coupled to the demodulator 40. The demodulator 40 also feeds the received data to conventional receiver apparatus (not shown). An OR gate 22 couples the reference unique word detector 21, to a burst delay counter 23. The reference unique word detector 21 when detecting receipt of a unique word produces a sync pulse, which is coupled through OR gate 22 to reset burst delay counter 23. Burst delay counter 23, which may be a conventional multistage counter, receives in addition to the sync pulse, a scaled control clock pulse train from pre-scaler 24. A control clock at the outlying station feeds signals of a predetermined repetition rate to clock prescaler 24, which is merely a divider. The output of clock pre-scaler 24 is a pulse train of scaled control clock pulses at a repetition rate which bears a predetermined ratio with the repetition rate of the control clock pulses. The scaled control clock pulses operate burst delay counter 23. A plurality of stages of burst delay counter 23 feed a decoder 25. Decoder 25 operates in response to a particular combination of output signals and provides, when such a combination exists, a start-of-burst pulse to flip-flop 32 and burst duration counter 33. Burst duration counter 33 may be a conventional multistage counter. The particular output configuration of burst delay counter 23 that decoder 25 operates in response to will be described in more detail below. Burst delay counter 23 also provides an output to delay modulo detector 30.

Delay modulo detector 30 responds to a different combination of signals from burst delay counter 23. When the latter combination of signals is present, the delay modulo detector 30 provides an output pulse to OR gate 22 which is capable of resetting burst delay counter 23 in the same manner as the sync pulse resets it.

Flip-flop 32, which receives the start-of-burst pulse from decoder 25, provides an output to modulator 36 and data buffer and control 35. The burst duration counter 33 also receives the start-of-burst pulse and is reset thereby. A decoder 38 monitors the changing configuration of the output of burst duration counter 33 and, in response to a predetermined output combination provides a reset signal to flip-flop 32. The burst duration counter 33 is operated by the same scaled control clock pulses which operate the burst delay counter 23.

Data buffer and control 35 receives three inputs in addition to the input from flip-flop 32. Data buffer and control 35 receives continuous data from a 100 bit per second teletype channel. Data buffer and control 35 also receives a continuous clock to clock into the buffer the continuous data referred to above. As is well known by those skilled in the art, the data buffer and control has the continuous data read in at a rate of 100 bits per second from the conventional teletype channel. However, when transmitting, data is read out of the data buffer and control 35 at a much higher rate, in this preferred embodiment at 16,000 bits per second. Therefore, data buffer and control 35 also receives a transmit burst clock at the 16,000 bit per second rate. Information pulses when read out of data buffer and control 35 are provided to modulator 36. Modulator 36 also receives the 16,000 bit per second burst clock pulses and provides the modulated output to transmit RF channel 37 which couples the modulated data signals through an antenna for transmission to satellite 34.

The operation of the apparatus thus far referred to is as follows: A master station transmission, whose format is illustrated in FIG. 1, is received by RF channel 39 and demodulated in demodulator 40. These components are conventional in the art and more detailed descriptions thereof are deemed unnecessary. The reference unique word detector 21 detects the presence of unique word 11A and provides a sync pulse responsive thereto. A sync pulse coupled through OR gate 22 resets burst delay counter 23. Burst delay counter then counts in response to scaled control clock pulses from clock pre-scaler 24. When burst delay counter 23 reaches a count corresponding to the count to which decoder 25 is responsive, decoder 25 produces a start-of-burst pulse. This pulse has two effects. In the first place, this pulse sets flip-flop 32 to provide an output to modulator 35 and data buffer and control 35. This output marks the beginning of the burst window and the beginning of the message burst. At the same time, burst duration counter 33 is reset and it begins to count in response to scaled control clock pulses from clock prescaler 24. When the output of burst duration counter 33 matches that of decoder 38, an output is provided to reset flip-flop 32. This action removes the signal from the Q output of flip-flop 32 thus terminating the burst window and terminating the message burst from the particular station involved.

Delay modulo decoder 30 is also permanently connected to burst delay counter 23 so as to respond to a count in burst delay counter 23 corresponding to 1000 milliseconds or 1 second. When delay modulo decoder 30 receives a count from burst delay counter 23 corresponding to 1 second it produces an output signal, which is coupled through OR gate 22 to reset the burst delay counter 23. Should, for some reason, the unique word reference marker not be received or not be properly decoded by reference unique word detector 21, the output of delay modulo decoder 30 will serve to reset burst delay counter 23. The decoder 30 is responsive to a count corresponding to 1 second corresponding to the master station time frame period. Those skilled in the art will understand how decoder 30 may respond to any count corresponding to the master station time frame period.

It should be apparent that the particular configuration to which decoders 25 and 38 respond respectively control the initiation and termination of the transmission. Thus, as one example, the decoder 25 can be arranged to respond to burst delay counter 23 counting up to the equivalent of 40 milliseconds to initiate transmission for a first time slot. Decoder 38 can be arranged to respond to a count in burst duration counter 33 corresponding to 60 milliseconds. The 60 milliseconds comprise the sum of the preamble portion 16 and message portion 17. For the next time slot decoder 25, at another station, is arranged to respond to a burst delay counter 23 output corresponding to 140 millseconds and decoder 38 responds to a count corresponding to 60 milliseconds. For a further time slot the decoder 25, at still another station, is arranged to respond to a count in burst delay counter 23 corresponding to 240 milliseconds. And, in general, for time slot N the decoder 25 is arranged to respond to a count in burst delay counter 23 corresponding to $[(N-1)100 + 40]$ milliseconds. Each decoder 38 is arranged to respond to a count in burst duration counter 33 corresponding to 60 milliseconds. Since burst delay counter can only count up to a count corresponding to 1 second, N may then vary from 1 to 10.

In actual implementation, each of decoders 25 and 38 may be AND gates connected to the burst delay counter 23 and burst duration counter 33, respectively. The decoder 38 may be so connected to the respective stages of burst duration counter 33 so as to respond to a count corresponding to 60 milliseconds. The decoder 25 may be connected to burst delay counter 23 through manually controlled switching contacts selectively operable to engage the various stages of burst delay counter 23 so as to respond to a count corresponding to $[(N-1)100 + 40]$ milliseconds where N can be in the range from 1 to 10.

Other apparatus may be provided to selectively connect decoder 25 to the various stages of burst delay counter 23 as recited above, in response to time slot assignments made by the master station and transmitted during master station time frame 11. Such apparatus is well known to those skilled in the art and a detailed disclosure thereof is deemed unnecessary. See for instance U.S. Pat. No. 3,564,147.

The apparatus described above is sufficient for those cases where the TDMA frame illustrated in FIG. 2 has a duration which is less than or equal to the master station time frame, illustrated in FIG. 1. As described above, however, the TDMA time frame illustrated in FIG. 2 has a duration of 8 seconds whereas the master station time frame has a duration of 1 second. Therefore, the TDMA time frame cycles once for every 8 cycles of the master station time frame. In order to properly detect every eighth master frame, super frame detector 26, OR gate 27, frame counter 28, decoder 29, and frame modulo decoder 31 are provided. Super frame detector 26 is connected to the modulator 40 as is reference unique word detector 21. An output of super frame detector is coupled through OR gate 27 to reset frame counter 28. Frame counter 28 may be a conventional multi-stage counter. Frame counter 28 is operated by the scaled control clock pulses from clock prescaler 24. A decoder 29 is connected to separate stages of frame counter 28 so that it can respond to a predetermined count of frame counter 28. The manner in which decoder 29 is connected so as to respond to the predetermined count, and the manner in which the predetermined count is determined will be explained later. Upon reaching this predetermined count, however, the output of decoder 29 is provided as an input to decoder 25.

Frame modulo decoder 31 is also connected to frame counter 28 to respond to a different predetermined count of frame counter 28. When frame modulo decoder 31 detects this predetermined count it provides an input to OR gate 27 which serves to reset frame counter 28 in the same manner that the super frame detector 26 output causes frame counter 28 to be reset.

The manner in which decoder 25 and decoder 29 cooperate to select a predetermined time slot will now be explained. Decoder 25, being controlled by burst delay counter 23 which is reset at every period of the master station time frame, is therefore reset every second. Decoder 25 may then select one of the 10 time slots occurring in any 1 second period of time. Decoder 29 selects one of the 8 groups of 10 time slots which occur in a single TDMA time frame. Thus, for instance, if a station is to transmit within time slot 14, decoder 25 would be set to respond to the count corresponding to N equals 4, and decoder 29 would be set to respond to a count corresponding to the second of the 8 frames. Alternatively, if a station were to transmit in time slot 44, the decoder 25 would be arranged to respond to the same count corresponding to N equals 4, and the decoder 29 would be arranged to correspond to a count corresponding to the fifth 1 second interval of time subsequent to the super frame detector output. The manner in which decoder 29 is arranged to respond to the different predetermined counts can be the same as that explained for decoder 25, that is, an AND gate hardwired to switching contacts which are manually settable. Alternatively, this connection can be automatically made by electronic switching units responsive to signal impulses from the master station, as is well known in the art. If apparatus is available to automatically set decoders 25 and 29 it is then possible to also automatically set decoder 38. The advantage thus gained is that the message burst duration may then be variable for different time slots. Thus the output of decoder 29 forms one input to decoder 25, such that decoder 25 produces an output if a signal is received on each of its inputs including the input from decoder 29.

Certain other apparatus would also be preferably used, although not specifically illustrated. For instance, the delay modulo detector 30 and frame modulo detector 31 can supply missing reference unique words or super frame words if that becomes necessary. However, if the reference unique word or super frame words are absent for an extended period of time the outlying station at which these signals are not received may become out of sync due to variations in locally generated clock signals as opposed to the master station clock. To this end, a counter may be arranged so as to count the instances of missing unique words or super frame words and to shut down this station if a predetermined count is exceeded. Of course, if during the counting process a unique word or super frame word is received, then the counter is reset.

In order to acquire a time slot, in those cases where the outlying stations decoders 25 and 29 are manually selectable to different time slots, the operator must have information as to which time slots are available. To this end, the master station, within time frame portion 11, transmits information as to the status of each of the time slots. A decoder at each of the outlying stations makes this information visible by indicator lights or otherwise. Therefore, when a station desires to transmit, the operator merely properly sets decoder 25 and decoder 29 to select a time slot that is available. The data buffer and control 35 has permanently stored therein information corresponding to the preamble portion 16 of the message burst. This includes the station identity. Thus, when the operator selects the settings for decoder 25 and 29, the station identity is sent in the selected time slot. If no other station has requested this particular time slot the master station provides a go ahead signal which is received and decoded at the outlying station. When the go ahead signal is received it is only then necessary to connect the continuous data line to the data source and transmissions will occur automatically in the proper time slot.

With the apparatus thus far explained, the decoders 25, 29 and 38 will provide that in any 100 millisecond time slot, a station may transmit in a 60 second portion thereof. Thus, the guard time of 40 milliseconds is provided. In the foregoing description, the guard time occurs during the first 40 milliseconds of the station's 100 millisecond time slot, and the information transmission or message burst occurs during the later 50 millisecond portion. However, it is within the scope of the present invention to provide the guard time in the last 40 millisecond period of the time slot and the message burst in the first 60 millisecond portion. To this end, the decoders 25 and 29 may be arranged to respond to a count corresponding to (N−1) 100 milliseconds. In combination with the decoder 38 arranged to allow transmission for only 60 milliseconds, the 40 millisecond guard time will be provided in the last 40 milliseconds of the 100 millisecond time slot. Although, as has been explained above, the guard time may occur either at the beginning or the end of the time slot, it is essential that the arrangement throughout a particular system be uniform. Although the present application utilizes as exemplary a 100 millisecond time slot with a 40 millisecond guard time, those skilled in the art will understand that the time slot duration TDMA time frame and master station time frame may all be varied to suit the particular circumstances. What is essential is that each message burst from each of the stations has an associated guard time which is no less than the double hop propagation delay variation within the system. Furthermore, although the guard time may occur either prior to or subsequent to any message burst, the location of the guard time in the time slot must be uniform throughout the system.

In operation, the transmissions of the various outlying stations are separated by a nominal separation equal to the guard time. This guard time is selected to be at least equal to the double hop propagation delay variation $\epsilon$ for the system. A reasonable value for the delay variation $\epsilon$ is 20 milliseconds and therefore a reasonable period for the guard time is 40 milliseconds. It should be apparent from the foregoing that with the guard time specified above, the various transmissions from the outlying stations will not overlap and will interleave at the satellite for a retransmission to the master station.

What is claimed is:

1. In a time multiplex communication system wherein a plurality of stations with a propagation delay variation $\epsilon$ transmit in a TDMA mode to a satellite, a method ensuring non-overlapping reception at said satellite without measuring actual propagation delay comprising the steps of:

a. transmitting to each of said stations a reference marker, b. transmitting from each station that has information to transmit in a time slot beginning a predetermined time subsequent to receipt of said marker, said predetermined time different for each of said stations, c. controlling said transmissions to last for a predetermined time less than the duration of said time slot so that a guard time G is provided which is at least equal to twice said propagation delay variation $\epsilon$.

2. The method of claim 1, wherein said transmissions are controlled to have a duration equal to or greater than said guard time G.

3. The method of claim 1 wherein at each said station said guard time G precedes said transmission.

4. The method of claim 1 wherein at each said station said guard time G succeeds said transmission.

5. The method of claim 1 wherein said time slot has a duration T, said transmission has a duration $t_B$ and said guard time $G \geq 2\epsilon$ such that $T=(t_B+G)$ and to $t_B \geq G$.

6. A TDMA communication system for transmitting a plurality of burst mode messages from a plurality of stations for non-overlapping reception at a satellite transponder which eliminates the necessity for measuring propagation delays at each of said stations comprising:

marker reception means at each said station for detecting receipt of a time reference marker, the time of receipt of said marker varying as the distance from each said station to said satellite, first and second delay means at each station, said first delay means settable at each station to a preassigned time slot of predetermined duration for each said station's transmission, transmitter means at each said station initiated at the expiration of said first delay, said second delay means at each station for controlling the termination of said transmitter means, said second delay means terminating said transmitter means $2\epsilon$ prior to termination of said time slot duration at said station where $\epsilon$ is the maximum propagation delay variation among all said stations.

7. The system of claim 6 in which said predetermined duration is equal for all stations.

8. The system of claim 7 in which said predetermined duration is equal for all stations and the difference between said predetermined duration and the quantity $2\epsilon$ is at least equal to $2\epsilon$.

9. The system in claim 6 in which said first delay means comprises a counting means operated at a predetermined rate and decoding means, responsive to the condition of said counting means for producing a signal after said counting means has counted a time interval corresponding to a first delay, said transmitter means responsive to said signal produced by decoding means.

10. The apparatus of claim 6 in which said second delay means comprises a counting means operated at a predetermined rate and decoding means, responsive to the condition of said counting means for producing a signal after said counting means has counted a time interval corresponding to a second delay, said transmitter means responsive to said signal produced by said decoding means.

11. In the system of claim 6 in which said first delay means comprises a first counting means operated at a predetermined rate and a first decoding means, responsive to the condition of said counting means for producing a first signal after said counting means has counted a time interval corresponding to a first delay, said second delay means comprising a second counting means operated at a predetermined rate and second decoding means, responsive to the condition of said second counting means for producing a second signal after said second counting means has counted a time interval corresponding to a second delay, said transmitter means responsive to signals produced by said first and second decoding means.

12. In a time multiplex communication system in which a plurality of stations may transmit information messages for reception at a satellite, said information message from each station being transmitted in a TDMA burst mode and wherein transmissions to and from said satellite are subject to propagations delays equal to a minimum propagation delay plus a variable propagation delay $d$ in the range $o \leq d \leq \epsilon$, each of said stations transmitting in a preassigned time slot of duration T in a cyclical time frame, each said time slot beginning a predetermined time after receipt of a marker, apparatus for ensuring non-overlapping reception at said satellite of said message without requiring actual measurement of progagation delay comprising, a. means for detecting receipt of said marker, b. first delay means responsive to said means for detecting for producing a first signal, c. second delay means responsive to said first signal for producing a second signal, a predetermined time after receipt of first signal, said predetermined time being less than or equal to T-2 $\epsilon$, d. transmission means for information transmissions, e. control means responsive to said first and second signals for initiating said transmission means in response to said first signal and for inhibiting said transmission means in response to said second signal.

13. The apparatus of claim 12 wherein said both first and second delay means includes a counter, each of which operates at a predetermined rate.

14. The apparatus of claim 13 in which said control means includes bi-stable circuit means for initiating said transmission.

15. In a time multiplex communication system in which a plurality of stations may transmit information messages for reception at a satellite, said information messages from each station being transmitted in a TDMA burst mode and wherein transmissions to and from said satellite are subject to propagation delays equal to a minimum propagation delay plus a variable propagation delay $d$ in the range $o$ $d$23 $\epsilon$, each of said stations transmitting in a preassigned time slot of duration T in a cylical time frame, apparatus for ensuring non-overlapping reception at said satellite of messages from the plurality of stations without requiring measurement of actual propagation delay comprising, a. first means at each of a plurality of said stations for determining the initiation of a time slot at each of said plurality of stations, and producing a first signal simultaneous therewith, b. second means at each of a plurality of said stations operated in response to said first signal for producing a second signal at a time no greater than T-2 ε after production of said first signal, and control means for initiating transmission from each said station of said plurality of stations in response to said first signal and for terminating transmissions from each of said plurality of stations in response to said second signal.

* * * * *